United States Patent [19]

Franklin, Jr.

[11] 4,404,818

[45] Sep. 20, 1983

[54] CO$_2$ SNOW COOLER WITH SNOW SPLITTING BOTTOM

[76] Inventor: Paul R. Franklin, Jr., P.O. Box 37978, Jacksonville, Fla. 32205

[21] Appl. No.: 417,993

[22] Filed: Sep. 14, 1982

[51] Int. Cl.$^3$ .............................................. F25D 3/02
[52] U.S. Cl. .......................................... 62/384; 62/35
[58] Field of Search ...................... 62/12, 35, 384, 388

[56] References Cited

U.S. PATENT DOCUMENTS

| 2,305,740 | 12/1942 | Shively .................................. | 62/388 |
| 2,738,654 | 3/1956 | Elston et al. .......................... | 62/388 |
| 3,783,633 | 1/1974 | Glynn et al. .......................... | 62/384 |

Primary Examiner—Ronald C. Capossela
Attorney, Agent, or Firm—Harvey B. Jacobson

[57] ABSTRACT

A vertically elongated hollow housing including opposite generally parallel side and end walls is provided and closed at its top by a top wall. CO$_2$ snow forming structure is disposed in a upper portion of the interior of the housing and a bottom wall structure closes the lower portion of the housing. The bottom wall structure includes an elongated horizontally disposed inverted V-shaped wedge of sharply tapered configuration extending between the end walls of the housing and the wedge is functional to split the lower portion of a quantity of snow disposed within the housing above the wedge and to force the lower portions of the quantity of snow into full surface-to-surface heat transfer relation with the inner surfaces of the lower portions of the side walls of the housing horizontally aligned with and opposing the wedge as the quantity of snow sublimes. Further, the side walls of the housing include vertically extending corrugations functioning to at least substantially double the exposed inner and outer surface area of the side walls. The corrugations themselves are trapizoidal in cross section whereby substantially full surface to surface contact between the lower portions of a quantity of CO$_2$ snow disposed within the housing and the inner surfaces of the corrugated side walls thereof is assured.

9 Claims, 4 Drawing Figures

U.S. Patent     Sep. 20, 1983     4,404,818
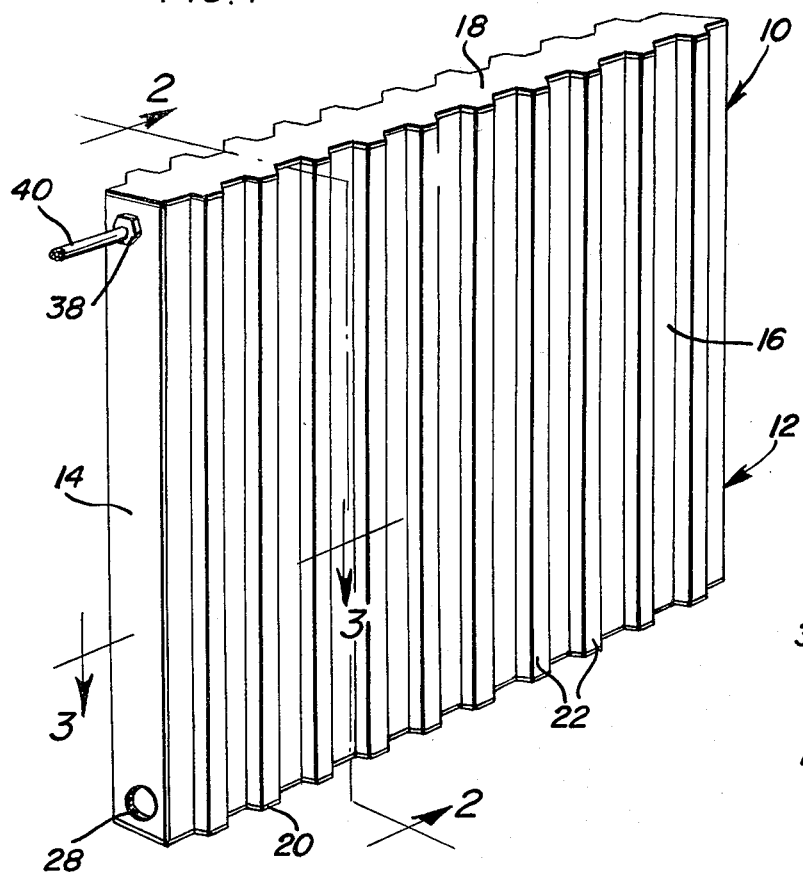
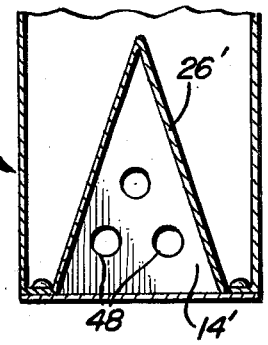
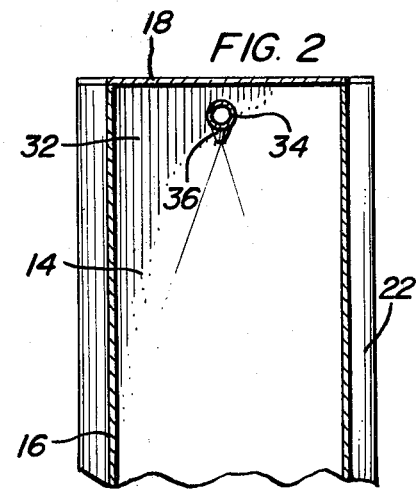
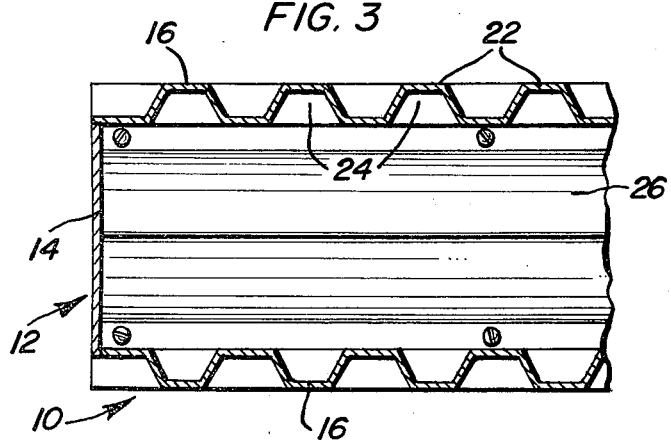
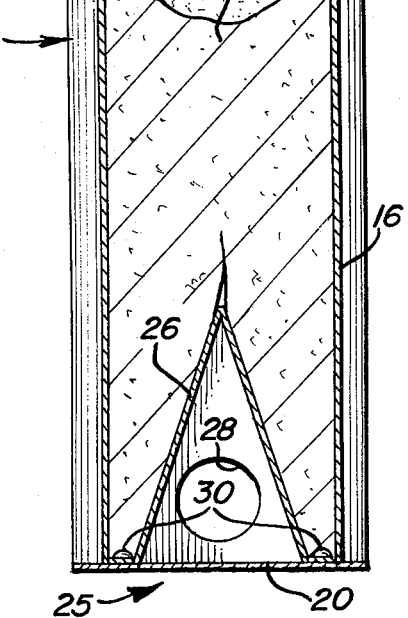

CO₂ SNOW COOLER WITH SNOW SPLITTING BOTTOM

BACKGROUND OF THE INVENTION

Various forms of coolers for containing $CO_2$ snow heretofore have been provided to be used in a cooling operation by blowing air to be cooled over the outer surfaces of the housing.

The usage of $CO_2$ snow in this manner is enjoying increased popularity in view of the dependable cooling operation which may be accomplished independent of the mechanical failures usually associated with mechanical refrigeration systems and because $CO_2$ cooler systems are considerably lighter in weight and thus may allow heavier refrigerated loads to be carried.

However, when $CO_2$ snow sublimes during the cooling process, spaces may form between the $CO_2$ snow and the confining walls of the cooler with the result that heat transfer between the exterior surfaces of the container or housing and the $CO_2$ snow therewithin is sharply reduced. Accordingly, a need exists for a $CO_2$ snow cooler which will allow sublimation of $CO_2$ snow therewithin independent of the forming of spacing between the inner surfaces of the cooler housing and the quantity of $CO_2$ snow confined thereby.

BRIEF DESCRIPTION OF THE INVENTION

The $CO_2$ cooler of the instant invention comprises a vertically elongated housing having corrugated opposite side walls to substantially double the heat transfer surfaces of the side walls and the lower portion of the interior of the housing is equipped with a sharply upwardly tapered inverted V-shaped wedge whereby $CO_2$ snow disposed within the housing and forced downwardly therein by gravity will be split by the wedge and continuously maintained in surface-to-surface contact with the inner surfaces of the corrugated side walls of the housing as the $CO_2$ snow sublimes.

The main object of this invention is to provide a $CO_2$ snow cooler which will be capable of absorbing considerable quantities of heat until substantially all of the $CO_2$ snow disposed therein has been sublimed.

Another object of this invention is to provide a $CO_2$ snow cooler in accordance with the preceding objects and in which $CO_2$ snow may be directly formed by liquid $CO_2$ being piped and sprayed into the snow cooler.

A further object of this invention is to provide a $CO_2$ snow cooler of light weight construction.

A final object of this invention to be specifically enumerated herein is to provide a $CO_2$ snow cooler in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a $CO_2$ snow cooler constructed in accordance with the present invention;

FIG. 2 is an enlarged vertical sectional view taken substantially upon the plane indicated by the section line 2—2 of FIG. 1;

FIG. 3 is an enlarged fragmentary horizontal sectional view taken substantially upon the plane indicated by the section line 3—3 of FIG. 1; and FIG. 4 is an enlarged fragmentary vertical sectional view similar to the lower portion of FIG. 2 but illustrating a modified form of snow cooler housing.

DETAILED DESCRIPTION OF THE INVENTION

Referring now more specifically to the drawings the numeral 10 generally designates the $CO_2$ cooler of the instant invention. The cooler 10 includes a housing referred to in general by the reference numeral 12 consisting of a pair of planar substantially vertical upstanding opposite end walls 14 and a pair of substantially parallel upstanding corrugated side walls 16 extending between and interconnecting corresponding vertical marginal portions of the end walls 14.

The upper portion of the housing 12 is closed by a top wall 18 extending between and secured relative to the upper marginal edges of the end walls 14 and the side walls 16 and the lower end of the housing 12 is closed by a bottom wall 20 secured to and extending between the lower marginal edges of the end walls 14 and the side walls 16.

The side walls 16 include vertical corrugations 22 and each of the corrugations 22 is substantially trapezoidal in horizontal cross section defining inwardly flared channels 24.

The bottom wall 20 comprises a part of a bottom wall structure referred to in general by the reference numeral 25 closing the lower end of the housing 12 and including, in addition to the bottom wall 20, a sharply upwardly tapered inverted V-shaped wedge body 26 secured to the bottom wall 20 and spaced inwardly of the lower marginal portions of the side wall 16. The wedge 26 is hollow and those portions of the lower ends of the end walls 14 registered with the open opposite ends of the elongated wedge 26 have openings 28 formed therethrough for air circulation through the interior of the wedge 26. It will be noted that the wedge 26 is inverted V-shaped in cross section and that the lower opposite side portions thereof are secured to corresponding marginal portions of the bottom wall 20 through the utilization of suitable fasteners 30.

The upper portion 32 of the interior of the housing 12 has a snow forming manifold 34 disposed therein and extending longitudinally of the housing 12. The manifold 34 includes longitudinally spaced downwardly directed outlet nozzles 36 and one end of the manifold 34 opens through the corresponding end wall 14 as at 38 and may have liquid $CO_2$ supplied thereto from a supply line 40. The liquid $CO_2$ is discharged from the supply line 40 into the manifold 34 and is thereafter discharged from the nozzles 36 for expansion and $CO_2$ snow forming within the housing 12. As the snow is formed within the housing a body 44 of $CO_2$ snow accumulates in the interior of the lower portion of the housing.

The cooler 10 is adapted to be used in conjunction with a thermostatically controlled blower assembly (not shown) operative to blow air to be cooled over the external surfaces of the housing 12 as additional cooling is needed. The quantity or body 44 of snow within the housing 18 is in good heat transfer relation with the internal surfaces of the housing and thus the air being blown over the external surfaces of the housing is chilled in an efficient manner.

However, as $CO_2$ snow absorbs heat it sublimes and changes directly from a solid state to a gaseous state with the result that in many instances spaces are formed between the body 44 of $CO_2$ snow and the internal surfaces of the container in which the snow is disposed. In order to prevent these heat transfer insulation spaces from forming, the wedge 26 splits the lower portion of the body 44 of $CO_2$ snow within the housing 12 as gravity forces the body 44 downwardly within the housing during sublimation of the body 44. The splitting action of the lower portion of the body 44 in a manner believed to be obvious from FIG. 2 of the drawings insures that the $CO_2$ snow 44 will be maintained in good heat transfer surface-to-surface contact with the inner surfaces of the side walls 16 horizontally registered with the wedge 26. The openings 28 enable air circulation through the interior of the wedge 26 to prevent icing on the internal surfaces thereof. Further, $CO_2$ snow may be admitted into the interior of the housing 12 by means other than being formed therein as a result of liquid $CO_2$ being discharged from the outlet nozzles 36.

With attention now invited more specifically to FIG. 4 of the drawings, there may be seen a modified form of cooler referred to in general by the reference numeral 10' and which is identical in all respects to the cooler 10, except that those portions of the end walls 14' registered with the opposite ends of the interior of the wedge 26' are each provided with a plurality of openings 48 as opposed to the single opening 28 provided in each of the end walls 14 of the housing 12.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A $CO_2$ snow cooler including a vertically elongated hollow housing having a least generally vertical peripherally extending side walls, a bottom wall structure closing the lower portion of said housing, said bottom wall structure including means defining a sharply upwardly tapering central wedge body operative, upon downward gravity forces acting upon a quantity of $CO_2$ snow disposed within said housing above said wedge body to split the lower portion of said quantity of snow for wedging the snow laterally into surface to surface heat transfer relation with the inner surfaces of the lower portions of said side walls horizontally aligned with and opposing said wedge body.

2. The snow cooler of claim 1 wherein said wedge body is defined by an elongated body of inverted V-shaped cross section.

3. The snow cooler of claim 2 wherein said housing includes generally parallel remote side and end walls and said elongated body extends between said end wall.

4. The snow cooler of claim 3 wherein said elongated body is open at its opposite ends and the lower end portions of said end walls extend across said body ends, said lower end portions of said end walls having openings formed therein registered with the open ends of said elongated body.

5. The snow cooler of claim 4 wherein said side walls include vertically extending corrugations.

6. The snow cooler of claim 5 wherein the upper end of said housing is closed by an upper end wall.

7. The snow cooler of claim 4 wherein said elongated body is spaced inwardly of the lower ends of said side walls.

8. The snow cooler of claim 7 wherein said side walls include vertically extending corrugation.

9. The snow cooler of claim 1 including $CO_2$ snow forming means in an upper portion of the interior of said housing.

* * * * *